United States Patent [19]

Gunesin et al.

[11] 4,414,374

[45] Nov. 8, 1983

[54] BUTADIENE-STYRENE-N,N-DIALKYLA-CRYLAMINE TERPOLYMERS

[75] Inventors: Binnur Gunesin, Uniontown, Ohio; Adel E. Halasa, Safat, Kuwait

[73] Assignee: The Firestone Tire & Rubber Company, Akron, Ohio

[21] Appl. No.: 269,298

[22] Filed: Jun. 1, 1981

Related U.S. Application Data

[63] Continuation of Ser. No. 132,745, Mar. 24, 1980, abandoned.

[51] Int. Cl.³ .................. C08F 212/08; C08F 236/10; C08F 220/54
[52] U.S. Cl. .................................. 526/217; 526/230; 526/248; 526/292.95; 526/303.1; 526/304; 526/307
[58] Field of Search ........... 526/217, 230, 248, 292.95, 526/303.1, 304, 307, 340

[56] References Cited

U.S. PATENT DOCUMENTS

| | | | |
|---|---|---|---|
| 2,631,997 | 3/1953 | Stewart | 526/340 |
| 2,680,111 | 6/1954 | Brown | 526/340 |
| 3,753,951 | 8/1973 | Miyoshi et al. | 526/292.8 |
| 3,887,651 | 6/1975 | Inomata et al. | 526/340 |

*Primary Examiner*—Harry Wong, Jr.

[57] ABSTRACT

The terpolymers disclosed herein comprise 60-87 percent by weight butadiene, 10-30 percent styrene and 3-15 percent N, N-dialkylacrylamide in the polymer molecules. These are prepared by emulsion polymerization using a free radical generating initiator system. These terpolymers have excellent green strength and are useful in tire compositions.

14 Claims, No Drawings

BUTADIENE-STYRENE-N,N-DIALKYLACRYLAMINE TERPOLYMERS

This is a continuation of application Ser. No. 132,745 filed Mar. 24, 1980, now abandoned.

BACKGROUND OF THE INVENTION

1. Field of the Invention

This invention relates to a terpolymer containing a major proportion of butadiene together with minor amounts of styrene and N,N-dialkylacrylamide. More specifically it relates to such terpolymers having excellent green strength and being suitable for incorporation in compositions used in tire manufacture and in related products.

2. Related Prior Art

No publications have been found which show terpolymers of butadiene, styrene and N,N-dialkylacrylamides. Copolymers of styrene and N,N-dimethylacrylamide (DMA) are known. For example, an article by G. Saini et al, which appeared in Die Makromolekulare Chemie 146 (165–171), describes the effect of various solvents on the copolymerization of DMA with styrene. However, no terpolymers are described.

SUMMARY OF THE INVENTION

In accordance with the present invention it has been found that terpolymers containing a major portion of butadiene, that is 60–87 percent by weight, preferably 65–80 percent of butadiene, and minor proportions of styrene and an N,N-dialkylacrylamide may be prepared which have excellent green strength and are suitable for use in tire compositions. In these terpolymers the styrene proportion is advantageously 10–30 percent, preferably 15–25 percent by weight and the N,N-dialkylacrylamide proportion is 1–15 percent, preferably 3–10 percent by weight.

These terpolymers are advantageously prepared by emulsion polymerization using a free radical-generating initiator, such as a peroxy compound, advantageously in combination with a reducing activator such as an alkyl amine.

In place of the styrene, numerous homologous compounds may be used including vinyl toluene, alphamethylstyrene, vinyl naphthalene, p-chloro-styrene, p-isopropyl-styrene, p-ethyl-styrene, etc.

Moreover, other conjugated dienes of 4–10 carbon atoms may be used in place of the butadiene including isoprene, 2,3-dimethyl-butadiene, 2-phenyl-butadiene, 2-chloro-butadiene, 1,3-pentadiene, etc.

The N,N-dialkylacrylamides may be represented by the formula $CH_2\!=\!C(R')CON(RX)_2$ wherein R' represents hydrogen or methyl, in which case the basic structure is an acrylamide or a methacrylamide, R represents a divalent saturated aliphatic group of 1–7 carbon atoms, X represents hydrogen, halogen, hydroxy or $NR''_2$, and R'' represents hydrogen or an alkyl group of 1–7 carbon atoms. The preferred compounds are N,N-dimethylacrylamide and the corresponding methacrylamide. Other compounds that may be used are those in which the $(RX)_2$ groups are diethyl, dipropyl, dibutyl, diamyl, diheptyl, diethylol, dipropylol, diamylol, di(-beta-chloroethyl), di(beta-iodoethyl), di(gamma-bromobutyl), di(beta-fluoroethyl), di($CH_2CH_2N(CH_3)_2$), di($CH_2CH_2CH_2NHCH_3$)$_2$, di($CH_2CH_2CH_2CH_2NH_2$), di($CH_2CH(CH_3)CH_2NHC_3H_7$)$_2$, di($CH(CH_3)CH_2CH(CH_3)N(CH_3)_2$)$_2$, etc.

Suitable initiators for preparing the terpolymers comprise $K_2S_2O_8$, $Na_2S_2O_8$, $(NH_4)_2S_2O_8$, ditertiarybutyl peroxide, diisopropyl benzene hydroperoxide, dibenzoyl peroxide, etc. Reducing activators that may be used include conventional alkali metal pyrosulfites, alkyl mercaptans, alkali metal formaldehyde sulfoxylates, alkali metal sulfites, alkali metal bisulfites, etc.

Since the polymerization is generally not taken to complete conversion and since the butadiene has a greater tendency for polymerization under the conditions used, the percent of butadiene is generally somewhat higher in the polymer molecules than in the monomer mixture and the other monomers are slightly lower in percent in the polymer than in the starting mixture. Consequently in order to obtain the desired proportions in the polymer it is advisable to take this fact in consideration in determining the proportions of monomers to use. Therefore it is generally desirable to have about 2–5 percent more of the styrene and 3–10 more of the acrylamide or methacrylamide in the monomer mixture than is aimed for in the polymer molecules. Accordingly the monomer mixtures generally contain 55–82 percent, preferably 60–75 percent butadiene, 12–35 percent, preferably 17–30 percent styrene and 5–30 percent, preferably 10–25 percent of the acrylamide or methacrylamide.

The polymerization mixture generally has an emulsifying agent such as sodium lauryl sulfate. Other satisfactory emuslifying agents are well known in the emulsion polymerization art. Generally at least 50 percent of the polymerization mass comprises the water which is the supporting medium for the emulsified particles of monomer and ultimately of polymer product. The remainder of the reaction mass comprises the monomeric mixture which may be as much as 50 percent by weight but generally no more than about 35 percent of the mass. Also present are an initiator and possibly an activator or reducing agent for the initiator, and possibly one or more modifiers that may be desired to alter favorably the properties of the polymer product.

The polymerization is generally conducted at a temperature no lower than 0° C. since the polymerization rate is very slow at such temperatures. Generally however, a polymerization temperature of 0°–35° C. is advantageous, preferably 5°–25° C. The molecular weight of the terpolymer is generally in the range of 20,000 to 250,000, preferably 50,000 to 150,000 as measured by osmometry ($m_n$).

In order to promote polymerization it is generally desirable to have a free radical generating initiator such as one of the peroxy compounds listed above, advantageously in a proportion of 0.1–5 seconds, preferably 0.5–2 percent based on the weight of monomeric material. It is also desirable in most cases, also to have an activator present such as an amine or an iron$^{++}$ salt to trigger or activate the peroxy compound into generation of free radicals and thereby initiate polymerization. Such activators are advantageously present in a proportion of about 0.01–5, preferably 0.1–2 percent based on the weight of monomer. Mercaptans may also be used as molecular control agents, acting as transfer agents to control the molecular weight.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

The various polymerizations described below are performed in 10 ounce bottles capped with a rubber septum through which various additions can be made by hypodermic needle after the cap is affixed to the bottle. The bottles are cleaned and dried before use. Inhibitor is removed from the acrylamide by distilling it prior to use. With the N,N-dimethylacrylamide, distillation is at 55° C. and 10 mm Hg.

EXAMPLE I

A 10 oz. bottle is charged with 100 gms. of distilled water and 2.5 gms. of emulsifier (sodium lauryl sulfate). The water-soluble initiator (0.3 gms. diisopropyl benzene hydroperoxide) is charged together with 0.1 gm. of n-dodecyl mercaptan. Styrene (14.0 gms.) and 14.0 gms. of N,N-dimethylacrylamide are charged and the bottle is capped. Air is purged by a stream of nitrogen introduced by a hollow needle projected through the septum into the bottom of the liquid and air removed with a stream of nitrogen passing out through another hollow needle in the septum. Then 36.0 gms. of butadiene is added through a hollow needle inserted into the rubber septum. Just before the bottle is placed on a rocker in a 5° C. bath, 0.25 gm. of tetraethylenepentamine is inserted by means of a hypodermic needle. The bottle is agitated and maintained at 5° C. for 16 hours. Then unreacted butadiene is removed and the polymer product is recovered by dumping the reaction mass into isopropanol. The coagulated product is recovered and dried overnight at 40° C. in a vacuum oven. Polymerization is terminated when conversion is about 55% and the product coagulated and recovered by dumping the reaction mass into isopropanol. Analysis of the polymer product shows 22.1 percent styrene, 73.9 percent butadiene and 3.96 percent N,N-dimethylacrylamide. Measurement for green strength in a standard tire formulation shows 68 psi initial, 74 psi at peak and 10 at break. The percent elongation is 580 percent. The percent N,N-dimethylacrylamide is calculated by first determining the nitrogen content and then calculating on the basis of one repeating unit of the N,N-dimethylacrylamide per atom of N.

EXAMPLE II

The procedure of Example I is repeated a number of times varying the amount of DMA. The amounts of DMA and the nitrogen and DMA contents are shown below in Table I.

TABLE I

| Percent DMA in Monomer Mixture | Wt. % N in Terpolymer | Percent DMA in Terpolymer |
|---|---|---|
| 22.0 | 0.6 | 4.3 |
| 22.0 | 0.7 | 4.95 |
| 20.0 | 0.5 | 3.53 |
| 19.0 | 0.4 | 2.82 |
| 16.0 | 0.15 | 1.5 |

EXAMPLE III

The procedure of Example I is repeated three times using a temperature of 50° C. instead of 5° C. and the amount of DMA is varied. Also, in view of the fast polymerization rate at the higher temperature, the reaction is continued for 8 hours instead of 16 hours. The amounts of DMA and the results are shown in Table II.

TABLE II

| Percent DMA Monomer Mixture | Wt. % N in Terpolymer | Percent DMA in Terpolymer |
|---|---|---|
| 10.0 | None detected | — |
| 16.0 | None detected | — |
| 22.0 | 0.25 | 1.8 |

EXAMPLE IV

The procedure of Example I is repeated using 10 gms. of N,N-dimethylacrylamide in place of the 14 gms. in Example I. The terpolymer analysis and the green strength determinations are given below in Table I together with the comparative results of Example I and comparative green strength from similar tire formulations using natural rubber in one case and a standard commercial styrene-butadiene (SBR) copolymer prepared by solution polymerization.

TABLE I

| Sample | Ex. I | Ex. IV | Natural Rubber | SBR Sol. Polymer |
|---|---|---|---|---|
| N,N—DMA (%) | 3.96 | 1.5 | — | — |
| Styrene (%) | 22.1 | 24.8 | — | 31 |
| Bd (%) | 73.9 | 73.4 | — | 69 |
| Mol. Wt. | 125,000 | — | — | — |
| Green Strength: | | | | |
| Initial (psi) | 68 | 79 | 40 | 47 |
| Peak (psi) | 74 | 85 | 40 | 43 |
| Break (psi) | 10 | — | 130 | 47 |
| Elongation (%) | 580 | 1250 | 940 | 900 |
| Str. at Max. El. (psi) | — | 16.5 | — | — |

EXAMPLE V

The terpolymer from Example IV is cured in a standard tire formulation and compared in properties with an identical tire formulation containing natural rubber. The comparative test results are given below in Table II. It will be noted that all except one of the properties of the Example IV terpolymer composition are improved over those of the natural rubber composition.

TABLE II

| | Ex. I | Natural Rubber |
|---|---|---|
| Scorch Time (Min.) | 15.0 | 11.0 |
| Optimum Cure (Min.) | 28.0 | 17.7 |
| 300% Modulus at 20 min. | 1380 | 1550 |
| Tensile (23 Min.) (psi) | 3730 | 2680 |
| Max. Elong. (23 Min.) (psi) | 570 | 430 |

EXAMPLE VI

The procedure of Example I is repeated a number of times with similar results using individually in place of the N,N-dimethylacrylamide equivalent amounts respectively of:

(a) N,N-Diethylacrylamide
(b) N,N-Dibutylmethacrylamide
(c) N,N-Diheptylacrylamide
(d) N,N-Di-(betachloroethyl)-acrylamide
(e) N,N-Di-(3-hydroxypropyl-1)-acrylamide
(f) N,N-Di(beta-dimethylamino-ethyl)methacrylamide
(g) N,N-Di-(3-diethylamino-propyl-1)acrylamide
(h) N,N-Di-(4-bromo-bytyl-1)-acrylamide While certain features of this invention have been described in detail with respect to various embodiments thereof, it will of course be apparent that other modifications can be made within the spirit and scope of this invention and it is not intended to limit the invention to the exact details shown except insofar as they are defined in the following claims:

The invention claimed is:

1. A terpolymer of improved green strength having its polymer molecules consisting essentially of 60–87 percent by weight of butadiene, 10–30 percent by weight of styrene and 1–15 percent by weight of an acrylamide of the formula:

$$CH_2=C(R')CON(RX)_2$$

wherein R' represents hydrogen or methyl, R represents a divalent saturated aliphatic group of 1–7 carbon atoms, X represents hydrogen, halogen, hydroxy or NR''$_2$, and R'' represents hydrogen or an alkyl group of 1–7 carbon atoms, said terpolymer being prepared by the steps of polymerizing in an aqueous emulsion at a temperature of 0°–35° C. a monomer mixture consisting essentially of 55–82 percent by weight of butadiene, 12–35 percent by weight of styrene and 5–30 percent by weight of said acrylamide and thereafter recovering the polymer product from the reaction mixture.

2. The terpolymer of claim 1 in which said acrylamide is N,N-dimethylacrylamide.

3. The terpolymer of claim 1 in which said acrylamide is N,N-dimethylmethacrylamide.

4. The terpolymer of claim 1 which contains 65–80 percent by weight of butadiene, 15–25 percent by weight of styrene and 3–10 percent by weight of N,N-dimethylacrylamide.

5. The terpolymer of claim 1 in which said aqueous emulsion also contains a free-radical generating initiator.

6. The terpolymer of claim 5 in which said free-radical generating initiator is a peroxy compound.

7. The terpolymer of claim 6 in which said peroxy compound is diisopropyl benzene hydroperoxide.

8. The terpolymer of claim 5 in which said aqueous emulsion also contains a material capable of activating said free-radical generation.

9. The terpolymer of claim 8 in which said activating material is an alkyl amine.

10. The terpolymer of claim 5 in which said monomer mixture contains 60–75 percent by weight of butadiene, 17–30 percent by weight of styrene and 10–25 percent by weight of said acrylamide.

11. The terpolymer of claim 10 in which said aqueous emulsion also contains 0.1–5 percent by weight based on monomer weight of a free-radical generating compound.

12. The terpolymer of claim 11 in which said free-radical generating compound is a peroxy compound.

13. The terpolymer of claim 11 in which said peroxy compound is diisopropylbenzene hydroperoxide.

14. The terpolymer of any one of claims 5–13 in which said temperature is 5°–25° C.

* * * * *

UNITED STATES PATENT AND TRADEMARK OFFICE
CERTIFICATE OF CORRECTION

PATENT NO. : 4,414,374
DATED : November 8, 1983
INVENTOR(S) : Binnur Gunesin and Adel F. Halasa It is certified that error appears in the above-identified patent and that said Letters Patent are hereby corrected as shown below:

IN THE TITLE the word "Dialkylacrylamine" should read

-- Dialkyl-Acrylamide --

Correct the second-named inventor's name from

-- Adel E. Halasa -- to -- Adel F. Halasa --

Signed and Sealed this

Tenth Day of April 1984

[SEAL]

Attest:

GERALD J. MOSSINGHOFF

Attesting Officer     Commissioner of Patents and Trademarks